United States Patent [19]

Lynch

[11] Patent Number: 5,005,365
[45] Date of Patent: Apr. 9, 1991

[54] THERMOSTAT SPEED BAR GRAPH FOR VARIABLE SPEED TEMPERATURE CONTROL SYSTEM

[75] Inventor: Gregory A. Lynch, Murfreesboro, Tenn.

[73] Assignee: Inter-City Products Corporation (USA), Lavergne, Tenn.

[21] Appl. No.: 278,789

[22] Filed: Dec. 2, 1988

[51] Int. Cl.⁵ ............................................. F25B 49/00
[52] U.S. Cl. ..................... 62/126; 62/228.4; 417/63
[58] Field of Search ..................... 62/126, 127, 228.4, 62/226; 236/94; 417/63; 165/11.1; 361/236, 239, 22

[56] References Cited

U.S. PATENT DOCUMENTS

| | | | |
|---|---|---|---|
| 4,146,085 | 3/1979 | Wills | 165/11 |
| 4,264,034 | 4/1981 | Hyltin et al. | 236/46 R |
| 4,296,727 | 10/1981 | Bryan | 126/116 A |
| 4,381,549 | 4/1983 | Stamp, Jr. et al. | 364/557 |
| 4,407,139 | 10/1983 | Ide et al. | 62/228.4 X |
| 4,460,125 | 7/1984 | Barker et al. | 236/94 |
| 4,553,400 | 11/1985 | Branz | 62/127 |
| 4,574,871 | 3/1986 | Parkinson et al. | 165/1 |
| 4,685,615 | 8/1987 | Hart | 236/94 |
| 4,724,680 | 2/1988 | Kawai | 62/228.4 X |
| 4,842,190 | 6/1989 | Orchard | 417/63 X |

FOREIGN PATENT DOCUMENTS

| | | | |
|---|---|---|---|
| 0146349 | 11/1979 | Japan | 417/63 |
| 0143271 | 8/1983 | Japan | 417/63 |
| 0165544 | 7/1986 | Japan | 62/228.4 |

Primary Examiner—William E. Wayner
Attorney, Agent, or Firm—Jeffers, Hoffman & Niewyk

[57] ABSTRACT

A thermostat for a variable speed temperature control system. The thermostat has a processor for determining a utilization ratio to drive the temperature control system. The processor also drives a display which graphically exhibits the utilization ratio.

18 Claims, 2 Drawing Sheets

THERMOSTAT SPEED BAR GRAPH FOR VARIABLE SPEED TEMPERATURE CONTROL SYSTEM

BACKGROUND OF THE INVENTION

The field of the invention is that of thermostat control units. More specifically, the field is that of thermostats having visual displays.

A variety of thermostatic control units serve to control data entry and display for temperature regulating systems. Examples of thermostat control units can be found in U.S. Pat. Nos. 4,264,034 (Hyltin), 4,319,711 (Barker), 4,373,664 (Barker), and 4,460,125 (Barker). A basic thermostat control has a temperature setting device for a home owner to indicate a desired ambient temperature. A thermostat also contains a heat sensing element which senses or measures the actual ambient temperature. The thermostat compares the ambient measured temperature with the desired temperature and cycles a single speed heating or cooling system on and off according to the disparity between the measured and desired temperatures. With the addition of microprocessing circuitry in a thermostat, more complicated functions become possible. For example, a home owner may specify different desired temperatures for different times of the day. Similarly, different desired temperatures for different days of the week may also be specified.

A thermostat normally provides a visual indication of both the measured ambient temperature and the home owner desired temperature. In older systems, the thermostat presents the desired temperature on a thermometer dial controlled by the homeowner. Also, the thermostat displays the observed ambient temperature on another thermometer dial, but one which is controlled by temperature sensing elements within the thermostat. Microprocessor controlled thermostats often display the temperature settings electronically with light emitting diodes (LED) or liquid crystal displays (LCD).

Thus, the general design of a thermostat is well known in the art. Variations upon the thermostat have been made for diagnostic and evaluation purposes. U.S. Pat. 4,146,085 (Wills) describes such a diagnostic thermostat. The system described in Wills has single lights which indicate the activity or inactivity of various components of its heat pump. Additionally, the Wills device has an ohm meter to check various sensors and also provide an indication of the temperature at various points in the system.

Another thermostat is described in U.S. Pat. No. 4,685,675 (Hart). The Hart thermostat shows the efficiency of a heating system. The Hart system computes efficiency as a function of the amount of BTU's supplied per degree day. The Hart thermostat has sensors which measure the inside and the outside temperatures. The difference between these two temperatures indicates the amount of work required to maintain the ambient temperature at the desired temperature. The Hart device requires a test period of operation to determine the normative system behavior. After determining the norm,. the Hart thermostat compares the efficiency of the unit in the current period with its normal efficiency. The Hart thermostat then numerically displays the efficiency on the thermostat face.

In addition, a thermostat used to measure efficiency is described in U.S. Pat. No. 4,296,727 (Bryan). The Bryan thermostat also numerically displays efficiency, but in terms of fuel consumption by the heating apparatus. In addition, the Bryan thermostat displays the smoke density in the stack. Both values are numerically displayed on a seven segment digital type of LED or LCD device.

None of these prior art devices are well adapted to use with a variable speed temperature control system. In a variable speed temperature control system, the prime movers of the system, i.e. the speeds of the compressor and blower motor, are variable and the temperature control elements work constantly. While a home owner expects the conventional single speed heating/cooling system to cycle on and off, cycling is not the case with the variable speed system. Instead of a period of operation followed by a period of non-operation, the variable speed system works at a fairly uniform level of activity. Without additional information, a home owner or a service man has no indication of the level of the system function. If a home owner does not notice the operation of the unit, then the home owner may conclude the unit is not working. Conversely, a home owner who notices the constant operation of the unit may conclude that the unit is not functioning properly because it does not cycle on and off. What is needed in the art is a thermostat which indicates the current speed of a variable speed temperature control system to provide an indication that the system is operative. In addition, what is needed in the art is a thermostat which displays the system operation graphically.

SUMMARY OF THE INVENTION

The thermostat of the present invention includes a bar graph which shows the current compressor operating speed of the variable speed heating/cooling system. It provides the user with an indication of the current percentage of capacity at which the unit is working. By providing the graphic indication of speed, a home owner can ascertain whether the variable speed unit is functioning.

One object of the present invention is to provide a thermostat which provides an indication of the current speed of the variable speed temperature control system. Another object of the present invention is to provide a device to graphically display the current speed of a variable speed temperature control system.

The present invention is a thermostat for a variable speed temperature control system. A processor device determines the speed at which the prime mover operates and the system provides the desired ambient temperature. The thermostat also has a display coupled to the processor. The display graphically projects the speed.

The thermostat shows the home owner the current utilization of the temperature control system with the speed bar graph displaying the current activity as a percentage of the system capacity. Single speed equipment is characterized by an on/off operation. The variable speed system may appear inoperative because it may run at a small percentage of capacity. Conversely, the variable speed system may appear to work erroneously because of its constant operation. The present invention displays the actual utilization of the system capacity, allowing the home owner to evaluate accurately the activity of the system.

The speed bar graph can also help with the diagnosis of problems involving temperature control systems. Tables of typical operating parameters associated with a given system speed can be made by observing a properly operating temperature control system under a variety of circumstances. With such a table, a service person could ascertain the system operating speed from the bar graph and quickly compare a faulty temperature control system with the operating characteristics of a properly operating system for the given circumstances.

Thus, the present invention describes a thermostat for a variable speed temperature control unit.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

The thermostat of the present invention performs the entry and control functions of a thermostat. A home owner specifies a desired temperature or temperatures on the thermostat. The thermostat compares the measured ambient temperature with the home owner desired temperature. If a significant difference between these temperatures exists, the thermostat instructs the master controller of the temperature control system. In a single speed system, the thermostat periodically turns the system on and off. With a variable speed system, the thermostat calculates a utilization ratio necessary to maintain the desired ambient temperature. For example, if the desired temperature is 80° and the ambient temperature is 70°, the thermostat would calculate a utilization ratio. The utilization ratio is a percentage of the cooling mechanism capacity required to produce the desired ambient temperature. Here the ratio equals the capacity required to continuously cool the ambient temperature by 10°. The actual cooling mechanism would run at that percentage of capacity to provide the desired ambient temperature.

Figure 1:
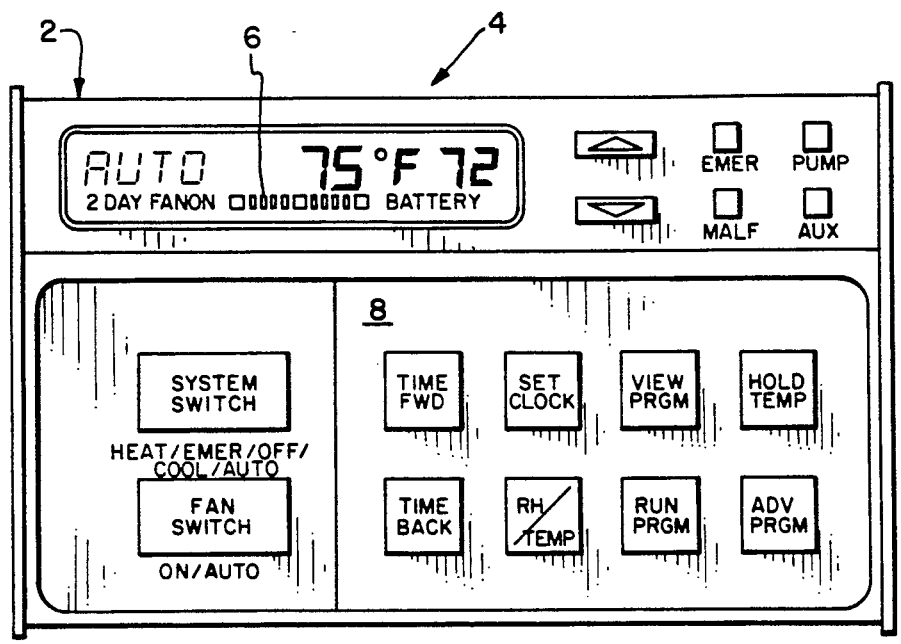
FIG. 1 is a front elevational view of the thermostat of the present invention.

FIG. 1 shows a thermostat of the preferred embodiment of the present invention. Thermostat 2 comprises the following: a control panel 8 and a display 4. Control panel 8 contains various buttons, lights, or other means to allow a home owner to program the thermostat 2. Display 4 is used to present the home owner with various conditions associated with the operation of the system. Typically, the current ambient temperature is shown on display 4. Devices which can comprise display 4 include liquid crystal displays (LCD's) or light emitting diodes (LED's). Within display 4 is speed bar graph 6. The display 4 can comprise one display element with a plurality of sections capable of graphical displays, such as seven (7) element character displays or pixel oriented displays. Alternately, display 4 can comprise a plurality of display elements, each element capable of different graphical configurations. Speed bar graph 6 is a section of display 4 which accommodates a horizontal bar whose length varies in direct proportion to the speed of the variable speed temperature control system. However, the speed bar graph need not be horizontal. Other forms of graphical depiction within the scope of the present invention include, but are not limited by, the following: a vertical bar graph, a circular pie graph or a line graph.

Figure 2:
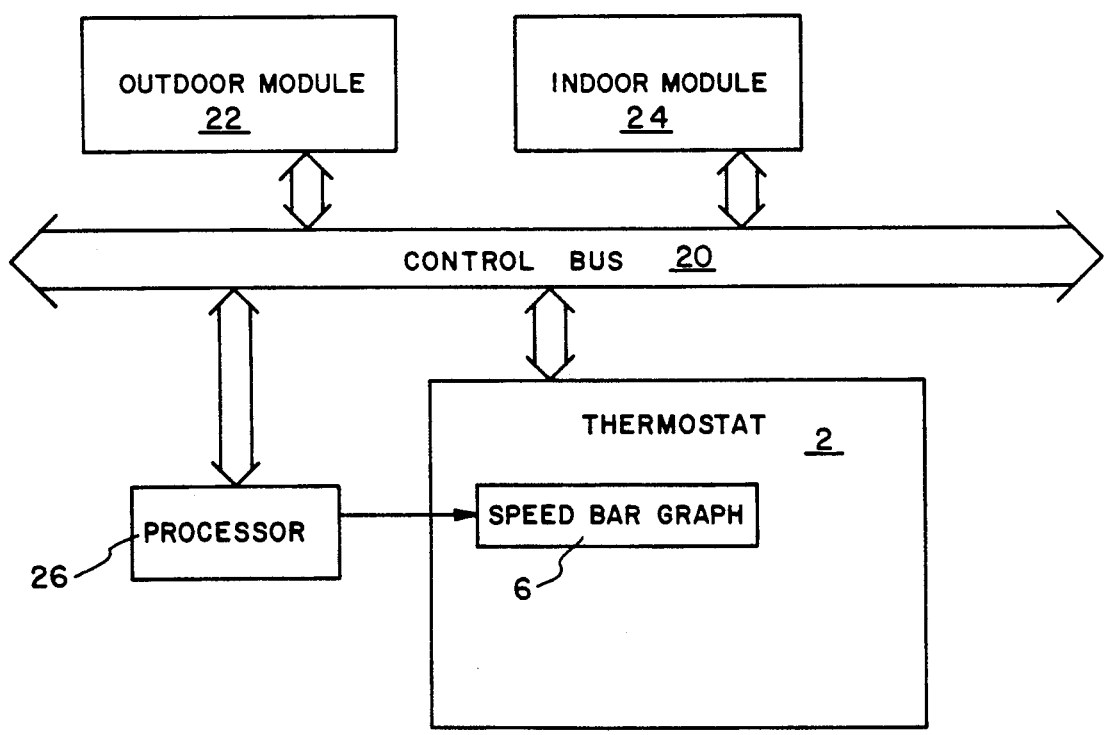
FIG. 2 is a schematic diagram of the general electric circuit configuration of the system of the present invention.

FIG. 2 shows a schematic diagram of the general configuration of the present invention. A control bus 20 couples the various elements of the variable speed temperature control system. Coupled to the control bus 20 are outdoor module 22, indoor module 24, processor 26 and thermostat 2. Outdoor module 22 and indoor module 24 represent various physical heating and/or cooling elements of the temperature control system. Thermostat 2 represents the physical device which contains the speed bar graph 6. Processor 26 represents the electronic device which calculates the utilization ratio necessary to provide the desired temperature. The processor 26 also drives the speed bar graph 6. In this general case, the processor 26 need not physically be located in either of the other three elements of the variable speed temperature control system shown in FIG. 2. All that is necessary for the practice of the present invention is for processor 26 to have access to the measured ambient temperature and the desired temperature, and to have a display driving means. However, in actual implementation, processor 26 usually resides in one of the other three elements. Processor 26 is connected to the indoor and outdoor modules 22, 24 and thermostat 2 by a control bus 20.

Figure 3:
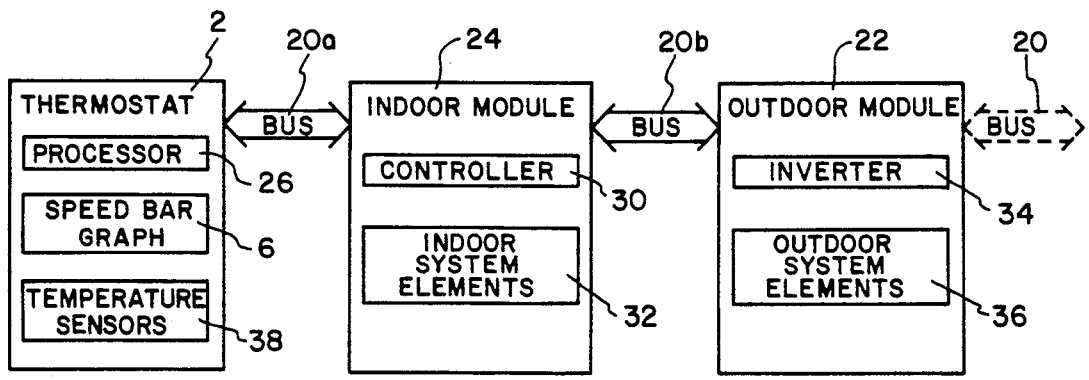
FIG. 3 is a schematic diagram of the preferred embodiment of the present invention.

The preferred embodiment of the present invention is depicted in FIG. 3. The system shown in FIG. 3 is controlled by master controller 30 within indoor module 24. Master controller 30 directly drives the indoor system elements 32 which are in indoor module 24. Master controller 30 sends and receives signals to thermostat 2 via bus 20a. Also, master controller 30 sends and receives signals over control bus 20b to outdoor module 22.

Thermostat 2 includes processor 26, speed bar graph 6 and temperature sensors 38. The processor 26 determines the utilization ratio from the specified desired temperature as compared to the ambient temperature measured by temperature sensors 38. Processor 26 also displays that utilization ratio on speed bar graph 6. In the preferred embodiment, the utilization ratio is represented by a number ranging from 0 to 200 which directly corresponds to percentages from 0–100.

The thermostat 2 is a microprocessor based thermostat specifically designed for use with variable speed temperature control systems. Any electronic thermometer can be used as the temperature sensors 38 in thermostat 2. Also, a variety of display devices can be used as speed bar graph 6. In the preferred embodiment of the present invention, speed bar graph 6 is comprised of liquid crystal display (LCD) elements. The processor 26 performs both the thermostat control function and the display driver function.

The preferred embodiment of the present invention includes the ability to program the temperature control.

Specifically, a homeowner can specify temperatures for different time periods on a 5 day-2 day (week/weekend) cycle. The thermostat allows for up to 4 programs per day. Temperature can be set within the range of 40° to 99° F., with a resolution of 1° F. Additionally, features such as computed energy management recovery, automatic mode changeover, hold temperature operation, and temperature override (two hours or until next time period) are included with the thermostat of the preferred embodiment.

Outdoor module 22 comprises inverter 34 and outdoor system elements 36. In the preferred embodiment, the outdoor module 22 is a microprocessor controlled induction inverter motor drive for a heat pump. The inverter 34 receives a utilization ratio from master controller 30. The utilization ratio received determines the speed of outdoor system elements 36.

The outdoor system elements 36 comprise a heat pump and additional circuitry for operating a refrigerant reversing valve and a fan on/off relay. Inverter 34 runs outdoor system elements 36. The inverter 34 takes a single phase AC current, rectifies it to DC, then chops and inverts the rectified DC current to produce current having a sinusodial waveform. The inverter 34 alters the frequency and voltage of the current supplied to the outdoor system elements 36 as specified by the utilization ratio received from master controller 30. The preferred embodiment of the present invention also allows for an optional two-speed fan and a defrost temperature switch in the outdoor module 22.

The temperature control system operates under the direction of master controller 30. Master controller 30 initiates a cycle by obtaining the utilization ratio from processor 26 via bus 20a. On the basis of the utilization ratio, master controller 30 directly drives various indoor system elements 32. In addition, master controller 30 sends inverter 34 instructions via bus 20b. Inverter 34 then provides the appropriate power level for the elements comprising outdoor system elements 36.

The control bus 20 of the preferred embodiment of the present invention is an RS-485 "compatible" interface. The bus is a three wire bus having two differential lines and one common line. The two differential lines form a serial communication channel using a byte oriented master slave protocol. The master controller 30 initiates all communication upon the bus. The primary communication involves the processor 26 sending the utilization ratio to master controller 30 and master controller 30 sending that utilization ratio to inverter 34. However, master controller 30 also sends status information to processor 26 for display on the thermostat 2. Additionally, inverter 34 sends information about the status of the elements of outdoor system elements 36. Thus master controller 30 sends processor 26 information about both the status of outdoor system elements 36 and of indoor system elements 32.

Indoor module 24 has a microprocessor which functions as the system master. The master controller 30 monitors the thermostat 2 and the outdoor module 22, controls the system communication bus, and provides the necessary commands to drive the temperature control system. In the preferred embodiment, the indoor system elements 32 comprise an indoor variable speed blower and an electric resistance heat control. The indoor variable speed blower operates as a function of compressor demand. However, when the electric resistance heat control operates under normal conditions, the indoor variable speed blower runs at its maximum speed. Also, master controller 30 can include a random access memory (RAM), read only memory (ROM), or both to store programming, bus addresses, communication protocols, or any combination thereof. The indoor system elements 32 could comprise many different suitable combinations of temperature control elements.

Figure 4:
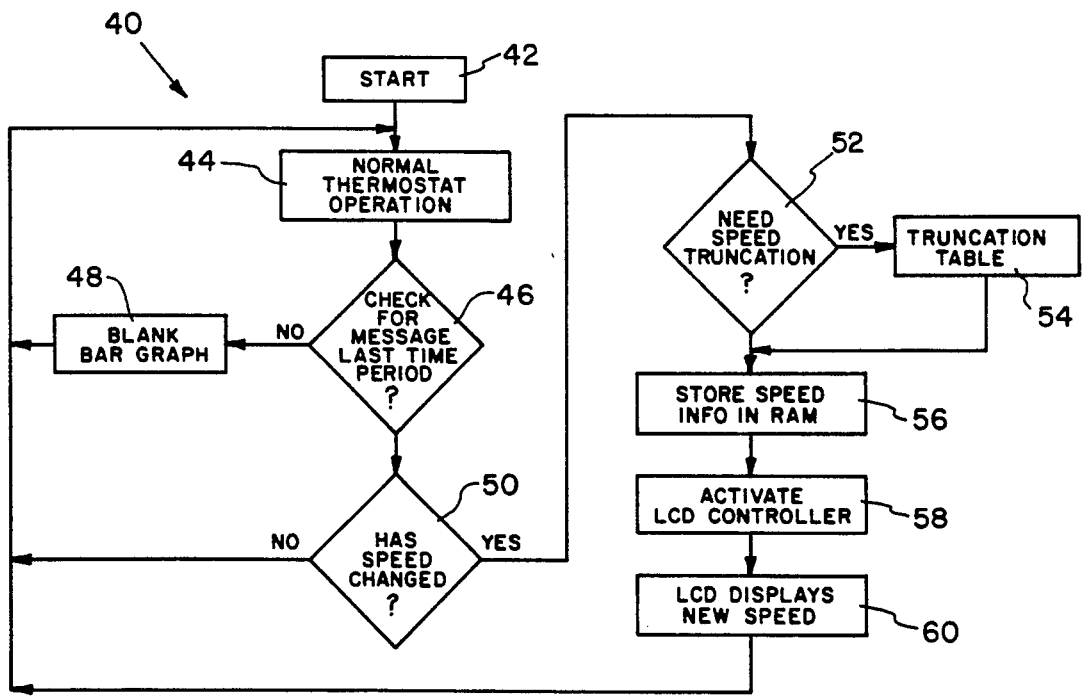
FIG. 4 is a flow chart of the variable speed control algorithm for the thermostat of the present invention.

A flow chart of the algorithm which derives the utilization ratio, thus determining the operation of inverter 34, is shown in the variable speed control flow chart 40 depicted in FIG. 4. The variable speed control flow chart 40 operates on a cycle. The cycle is based on a time period between controller calls to processor 26. During normal operation, the controller periodically sends requests for a control speed to the processor 26. The length of the cycle time period is predefined and can be whatever time period is convenient for the system involved.

Thus, if controller 30 does not receive a response from processor 26 when requested, it assumes that there is a problem in the communication system and a master reset of the control system will be issued by controller 30.

Operation begins at power on, represented by step start 42. At power on, the thermostat begins its normal operation at normal operation 44. At the end of each time period, the processor 26 executes message check 46. In this step, the processor determines whether it has received a request from controller 30 within the last time period. If the processor determines that no request message was received, control proceeds to step 48, blank bar graph. In step 48, the bar graph is deactivated to show zero percent utilization. Step 48 returns control to normal operation 44.

If a request message was received in the last period, control proceeds to speed change check 50. In step 50, the processor 26 determines whether the speed has changed over the last time period. If the processor observes no change, control returns to normal operation 44. However, if the speed has changed, then the bar graph requires updating.

After observing a speed change, control proceeds to speed truncation check 52. By truncation, the processor converts the utilization ratio to a number representing how many elements of the bar graph display should be activated. If truncation is needed, then control proceeds to truncation table step 54. In the preferred embodiment of the present invention, the utilization ratio is given as a number (n) within the range of zero to two hundred (200). Zero represents the system in a non-operative state, while two hundred represents the system at full capacity. The speed bar graph of the preferred embodiment has ten elements, which show percentages from zero to one hundred percent with 10 percent intervals. The truncation table of the preferred embodiment of the present invention is listed below.

| Truncation Table | | |
|---|---|---|
| n | % | Segments On |
| 0–19 | 0–9.5 | 0 |
| 20–39 | 10–19.5 | 1 |
| 40–59 | 20–29.5 | 2 |
| 60–79 | 30–39.5 | 3 |
| 80–99 | 40–49.5 | 4 |
| 100–119 | 50–59.5 | 5 |
| 120–139 | 60–69.5 | 6 |
| 140–159 | 70–79.5 | 7 |
| 160–179 | 80–89.5 | 8 |
| 180–199 | 90–99.5 | 9 |

-continued

| Truncation Table | | |
|---|---|---|
| n | % | Segments On |
| 200 | 100 | |

After speed truncation check 52 and, if needed, truncation table step 54, control proceeds to store speed step 56. In step 56, the speed information is stored in RAM. Following step 56, activate controller step 58 occurs, which drives the display of the bar graph. After activation, LCD display step 60 displays the new speed in graphical form upon the speed bar graph. Once the proper graph is displayed on the speed bar graph 6, control returns to normal operation step 44.

Thus, the LCD display of thermostat 2 shows the current percentage utilization of the temperature control system. This speed bar graph 6 shows the home owner the current activity of the system as a percentage of capacity. Single speed equipment is characterized by an on/off cycle with the on portion of the cycle accompanied by noises of operation. The variable speed system may appear inoperative because it may run at a small percentage of capacity. Conversely, the variable speed system may appear to work erroneously because of its constant operation. The present invention displays the actual utilization of the system capacity, allowing the home owner to evaluate accurately the activity of the system.

The speed bar graph of the present invention can also help the diagnosis of problems involving temperature control systems. A normal utilization ratio table can be made by observing a properly operating temperature control system under a variety of circumstances. With such a normative table, a service person could quickly compare a potentially faulty temperature control system with normal utilization ratios for that equipment under similar circumstances.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A variable speed temperature control system, having a thermostat for selecting a desired ambient temperature to be maintained by said variable speed temperature control system, said system having a predetermined available capacity, said system comprising:
    a prime mover to maintaining the desired temperature, said prime mover adapted to continuously operate at an operating speed within a predetermined speed range whereby the utilized capacity of said temperature control system is a function of the operating speed of said prime mover and the available capacity of said system;
    means for determining the operating speed of said prime mover of said temperature control system to maintain a selected ambient temperature, said speed determining means calculating a utilization ratio as a function of the determined operating speed of said prime mover and the available capacity of said temperature control system;
    display means, coupled to said speed determining means, for graphically displaying said determined operating speed.

2. The thermostat claimed in claim 1 wherein said display means comprises a liquid crystal display (LCD).

3. The thermostat claimed in claim 1 wherein said display means comprises a plurality of light emitting diodes (LEDs).

4. The thermostat claimed in claim 1 wherein said speed determining means comprises a control means, said control means including a communication means for transmitting speed indicating signals corresponding to said determined operating speed to said display means.

5. The thermostat claimed in claim 1 further including a RAM to store a graphic representation of said utilization ratio.

6. The thermostat claimed in claim 1 wherein said display means includes ten display elements such that said display means is adapted to display said utilization ratio with each display element representing a ten percent increment.

7. A variable speed temperature control system, having a thermostat for selecting a desired ambient temperature to be maintained by said variable speed temperature control system, said system having a predetermined available capacity, said system comprising:
    a prime mover for maintaining the desired temperature, said prime mover adapted to continuously operate at an operating speed within a predetermined speed range whereby the utilized capacity of said temperature control system is a function of the operating speed of said prime mover and the available capacity of said system;
    control means for determining the operating speed of said prime mover of said temperature control system, said control means including display driver means for storing a graphic representation of said determined speed and including a random access memory;
    display means for graphically displaying said determined operating speed, said control means drivingly coupled to said display means for driving said display means.

8. The thermostat claimed in claim 7 wherein said display means comprises a liquid crystal display LCD).

9. The thermostat claimed in claim 8 wherein said display means comprises a plurality of light emitting diodes (LEDs).

10. The thermostat claimed in claim 7 wherein said control means calculates a utilization ratio which is a function of said predetermined speed and the capacity of said temperature control system.

11. The thermostat claimed in claim 10 wherein said display means includes ten display elements such that said display means is adapted to display said utilization ratio with each display element representing a ten percent increment.

12. In a variable speed temperature control system having a predetermined available capacity and including a prime mover for maintaining a desired temperature, the prime mover adapted to continuously operate at an operating speed within a predetermined range whereby the utilized capacity of the temperature control system is a function of the operating speed of the prime mover and the available capacity of the system, a thermostat for selecting a desired ambient temperature to be controlled by the variable speed temperature control system, said thermostat including processor means, coupled to the temperature control system prime mover, for determining the determined operating speed of the temperature control system, said processor means calculating a utilization ratio for determining said determined operating speed for said system, said utilization ratio being a function of said determined speed and the available capacity of said temperature control system.

13. The thermostat claimed in claim 12 wherein said display means comprises a liquid crystal display (LCD).

14. The thermostat claimed in claim 12 wherein said display means comprises a plurality of light emitting diodes (LEDs).

15. The thermostat claimed in claim 12 wherein said processor produces determined operating speed indicating signals, said processor further comprising a communication means for transmitting said determined operating speed indicating signals to said display means.

16. The thermostat claimed in claim 12 further comprising a random access memory (RAM) for storing a graphic representation of said utilization ratio.

17. The thermostat claimed in claim 12 wherein said display means includes ten display elements whereby said display means is adapted to display said utilization ratio with each display element representing an increment of ten percent.

18. In a variable speed temperature control system having a predetermined available capacity and including a prime mover for maintaining a desired temperature, the prime mover adapted to continuously operate at an operating speed within a predetermined speed range whereby the utilized capacity of the temperature control system is a function of the operating speed of the prime mover and the available capacity of the system, a thermostat for selecting a desired ambient temperature to be maintained by the variable speed temperature system, said thermostat comprising:

means for determining the operating speed of the prime mover of the temperature control system, said speed determining means producing speed signals indicative of said determined operating speed, said speed determining means calculating a utilization ratio for determining said determined operating speed for said system, said utilization ratio being a function of said determined speed and the available capacity of said temperature control system;

display means coupled to said speed determining means for graphically displaying said determined operating speed;

said speed determining means including communication means for transmitting said speed signals to said display means; and said communication means further connected to the prime mover of the temperature control system, said communication means operative to produce control signals indicative of the operating speed of the prime mover and for transmitting said control signals to said speed determining means.

* * * * *

UNITED STATES PATENT AND TRADEMARK OFFICE
CERTIFICATE OF CORRECTION

PATENT NO. : 5,005,365

DATED : April 9, 1991

INVENTOR(S) : Gregory A. Lynch

It is certified that error appears in the above-identified patent and that said Letters Patent is hereby corrected as shown below:

Column 4, line 9, after "to the" insert --desired--.

Column 6, line 37, after "whether the" insert --desired--.

Column 6, line 42, delete "speed change" and substitute therefor --change in desired speed--.

Column 7, line 9, after "the" insert --desired--.

Column 7, line 12, after "the new" insert --desired--.

Column 7, line 27, after "displays" insert --the desired speed which indicates--.

Claim 4, column 8, line 9, delete "thermostat" and substitute therefor --system--.

Claim 5, column 8, line 15, delete "thermostat" and substitute therefor --system--.

Claim 6, column 8, line 18, delete "thermostat" and substitute therefor --system--.

UNITED STATES PATENT AND TRADEMARK OFFICE
CERTIFICATE OF CORRECTION

PATENT NO. : 5,005,365

DATED : April 9, 1991

INVENTOR(S) : Gregory A. Lynch

It is certified that error appears in the above-identified patent and that said Letters Patent is hereby corrected as shown below:

Claim 8, column 8, line 45, delete "thermostat" and substitute therefor --system--; and
line 46, after "display" insert --(--.

Claim 9, column 8, line 47, delete "thermostat" and substitute therefor --system--.

Claim 10, column 8, line 50, delete "thermostat" and substitute therefor --system--; and
line 52, delete "predetermined" and substitute therefor --determined--.

Claim 11, column 8, line 54, delete "thermostat" and substitute therefor --system--.

Signed and Sealed this

Twenty-eight Day of March, 1995

Attest:

BRUCE LEHMAN

Attesting Officer     Commissioner of Patents and Trademarks